UNITED STATES PATENT OFFICE.

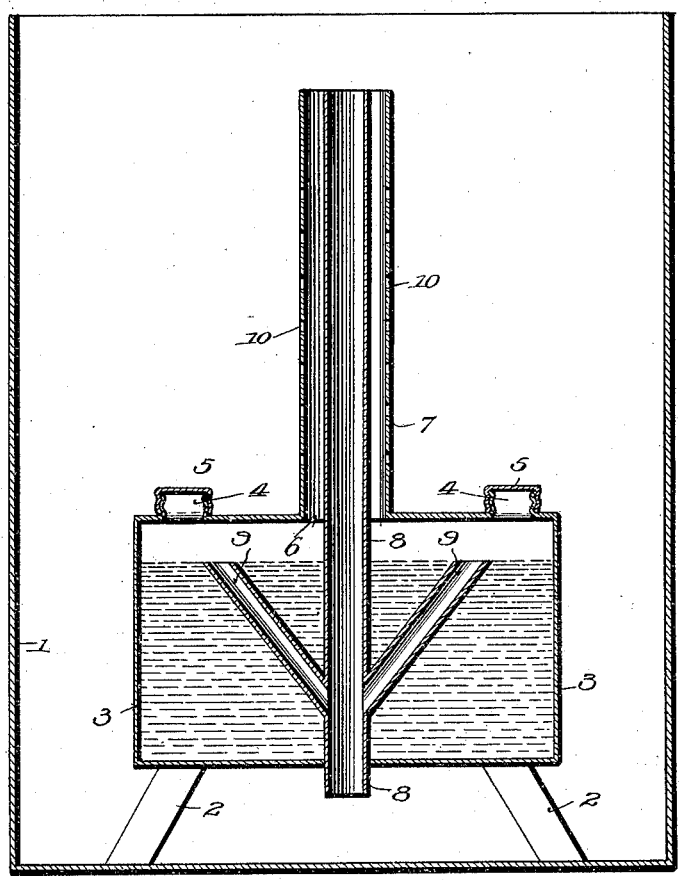

THOMAS VENNERS, SR., OF LYNCHBURG, VIRGINIA, ASSIGNOR OF ONE-HALF TO THOMAS RICHARD VENNERS, OF BROOKLYN, NEW YORK.

DISINFECTING DEVICE FOR FLUSHING-TANKS.

SPECIFICATION forming part of Letters Patent No. 685,885, dated November 5, 1901.

Application filed January 26, 1901. Serial No. 44,916. (No model.)

*To all whom it may concern:*

Be it known that I, THOMAS VENNERS, Sr., a citizen of the United States, residing at Lynchburg, in the county of Campbell and State of Virginia, have invented new and useful Improvements in Disinfecting Devices for Flushing-Tanks, of which the following is a specification.

This invention relates to a new and useful disinfecting device for flushing-tanks; and its primary object is to provide a device adapted to be placed within a tank and which contains an amount of soluble disinfectant which is automatically mixed with water, said mixture being retained within the device until discharged with the water in the tank.

With this and other objects in view the invention consists in providing a receptacle which is mounted upon suitable standards and which is provided with a stand-pipe extending to a point adjacent to the top of the tank within which the device is located. The lower end of this pipe is open and is supported above the bottom of the tank, while that portion of the stand-pipe which extends above the receptacle is inclosed by a perforated pipe mounted upon said receptacle. Branch pipes are arranged within the receptacle and extend upward from the stand-pipe.

The invention also consists in certain novel features of construction and combination of parts, which will be hereinafter fully described and claimed, and illustrated in the accompanying drawing, showing the preferred form of my invention, and in which the figure is a vertical longitudinal section of a flushing-tank, showing the invention applied.

Referring to the figure of the drawing by numerals of reference, 1 is a tank of any desired construction, having inlets and outlets suitably arranged therein.

2 represents the standards of the attachment forming the subject-matter of this invention, and these standards serve to support a receptacle 3, having inlets 4, which are closed in any suitable manner, as by means of screw-caps 5. An aperture 6 is formed within the top of the receptacle 3, preferably adjacent to the center thereof, and extending upward from the edge of this opening is a perforated pipe 7. A stand-pipe 8 extends through the receptacle 3 and the perforated pipe 7, the lower end thereof being located at a point below the receptacle, but above the bottom of the tank 1. Upwardly-inclined pipes 9 are arranged within the receptacle 1 and extend from opposite sides of the stand-pipe 8. The free ends of these pipes 9 are located adjacent to the top of the receptacle. The receptacle is adapted to contain a suitable amount of soluble disinfectant. When water is admitted to the tank, it will rise within the stand-pipe 8 and the branch pipes 9, that portion thereof which is admitted to the pipes 9 being discharged into the receptacle and mixed with the disinfectant. After the water rises within the tank above the receptacle it will flow into the apertures 10, formed within the pipe 7, and will prevent the mixture within the receptacle from flowing outward through said apertures and into the tank. When the water is drawn from the tank, the mixture within the receptacle, which comprises water and dissolved disinfectant, will flow downward from the lower end of the stand-pipe 8 and will mix with the water of the tank. The undissolved portion of the disinfectant, however, will be retained within the tank and ready to partly dissolve within the second supply of water fed thereto. When it is desired to refill the receptacle 3, it is merely necessary to remove one or both of the caps 5.

It will be seen that the device is extremely simple and durable in construction and can be readily placed in tanks of different forms.

In the foregoing description I have embodied the preferred form of my invention; but I do not wish to be understood as limiting myself thereto, as I am aware that modifications may be made therein without departing from the principle or sacrificing any of the advantages of this invention, and I therefore reserve to myself the right to make such changes as fairly fall within the scope thereof.

Having thus described the invention, what is claimed, and desired to be secured by Letters Patent, is—

1. The combination with a receptacle having a perforated pipe extending therefrom; of a stand-pipe within said perforated pipe and opening below the receptacle, and branch pipes to said stand-pipe and located within the receptacle.

2. The combination with a receptacle; of a stand-pipe extending therethrough and having an inlet below the receptacle, and upwardly-inclined branch pipes to the stand-pipe and located within the receptacle.

3. The combination with a receptacle having inlets and closures for said inlets; of a stand-pipe extending through and above the receptacle, a perforated pipe mounted upon the receptacle and inclosing that portion of the stand-pipe adjacent thereto, and upwardly-inclined branch pipes to the stand-pipe and located within the receptacle.

4. The combination with standards; of a receptacle mounted thereon and having inlets thereto, closures for said inlets, a perforated pipe inclosing an aperture within the top of the receptacle and extending upward therefrom, a stand-pipe within the receptacle and a perforated pipe having an inlet and outlet below the receptacle, and inclined pipes extending upward from the stand-pipe and located within the receptacle.

5. The combination with a tank; of a receptacle mounted therein, standards for said receptacle, a stand-pipe extending through the receptacle and to a point adjacent to the top of the tank, a perforated pipe mounted upon the receptacle and inclosing the stand-pipe, and upwardly-inclined branch pipes to the stand-pipe and within the receptacle.

In testimony whereof I affix my signature in presence of two witnesses.

THOMAS VENNERS, Sr.

Witnesses:
D. C. FROST,
JNO. M. OTEY.